United States Patent [19]

Krahn

[11] Patent Number: 4,869,635

[45] Date of Patent: Sep. 26, 1989

[54] APPARATUS FOR CONTROLLABLY POSITIONING A LIFT MAST ASSEMBLY OF A WORK VEHICLE

[75] Inventor: Darren L. Krahn, Mentor, Ohio

[73] Assignee: Caterpillar Industrial Inc., Mentor, Ohio

[21] Appl. No.: 176,018

[22] Filed: Mar. 31, 1988

[51] Int. Cl.$^4$ .......................... B65G 65/00; B25J 19/00

[52] U.S. Cl. .................................... 414/274; 414/275; 414/786; 414/667; 901/46

[58] Field of Search ............... 414/117, 273, 274, 730, 414/275, 786, 667; 901/46, 47; 294/907; 180/274; 280/6 R, 6 H, 761

[56] References Cited

U.S. PATENT DOCUMENTS

| | | | |
|---|---|---|---|
| 3,557,974 | 1/1971 | Ostrander | 414/274 |
| 3,589,535 | 6/1971 | Reading | 414/273 |
| 3,986,007 | 10/1976 | Ruoff, Jr. | 414/730 |
| 4,286,417 | 9/1981 | Shelton | 901/41 |
| 4,331,417 | 5/1982 | Shearer, Jr. | 414/273 |
| 4,520,443 | 5/1985 | Yuki et al. | 364/424 |
| 4,529,315 | 7/1985 | Cohen et al. | 901/47 |

FOREIGN PATENT DOCUMENTS

| | | | |
|---|---|---|---|
| 2308930 | 8/1974 | Fed. Rep. of Germany . | |
| 2622075 | 12/1977 | Fed. Rep. of Germany . | |
| 2126002 | 9/1972 | France . | |
| 2360929 | 3/1978 | France . | |
| 0020263 | 2/1978 | Japan | 414/275 |
| 6219359 | 9/1982 | Japan . | |
| 6219360 | 9/1982 | Japan . | |
| 0002484 | 4/1987 | Pct Int'l Appl. | 414/274 |
| 526442 | 9/1972 | Switzerland . | |
| 2019809 | 11/1979 | United Kingdom . | |
| 2040442 | 3/1980 | United Kingdom | 414/275 |

*Primary Examiner*—Andres Kashnikow
*Assistant Examiner*—Timothy Newholm
*Attorney, Agent, or Firm*—Alan J. Hickman

[57] ABSTRACT

An apparatus and method for controllably moving the carriage assembly of a automated load handling vehicle vertically and horizontally. The carriage assembly includes load detecting sensors which detect the opening in the load during movement of the carriage assembly. Once the opening is located, a controller positions the carriage assembly at vertical and horizontal target positions, and moves the carriage assembly into the opening.

8 Claims, 7 Drawing Sheets

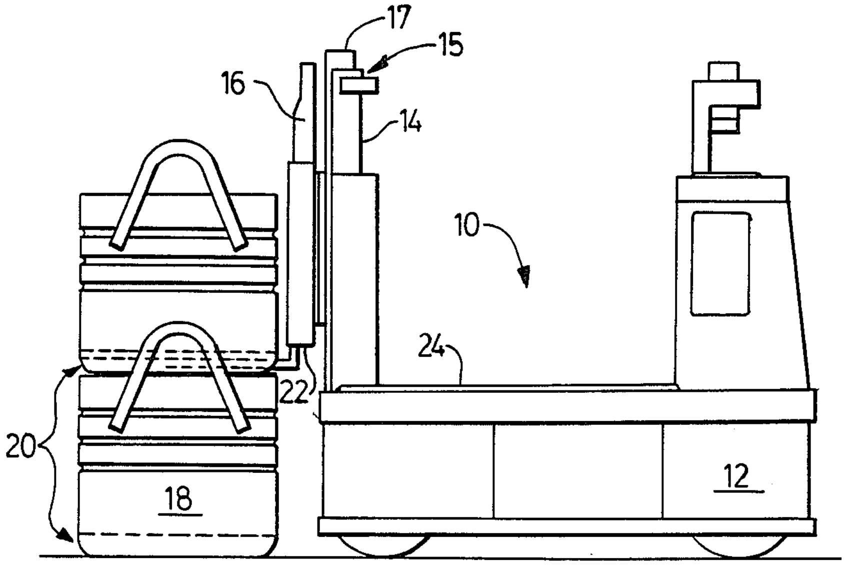
Fig. 1
Fig. 3
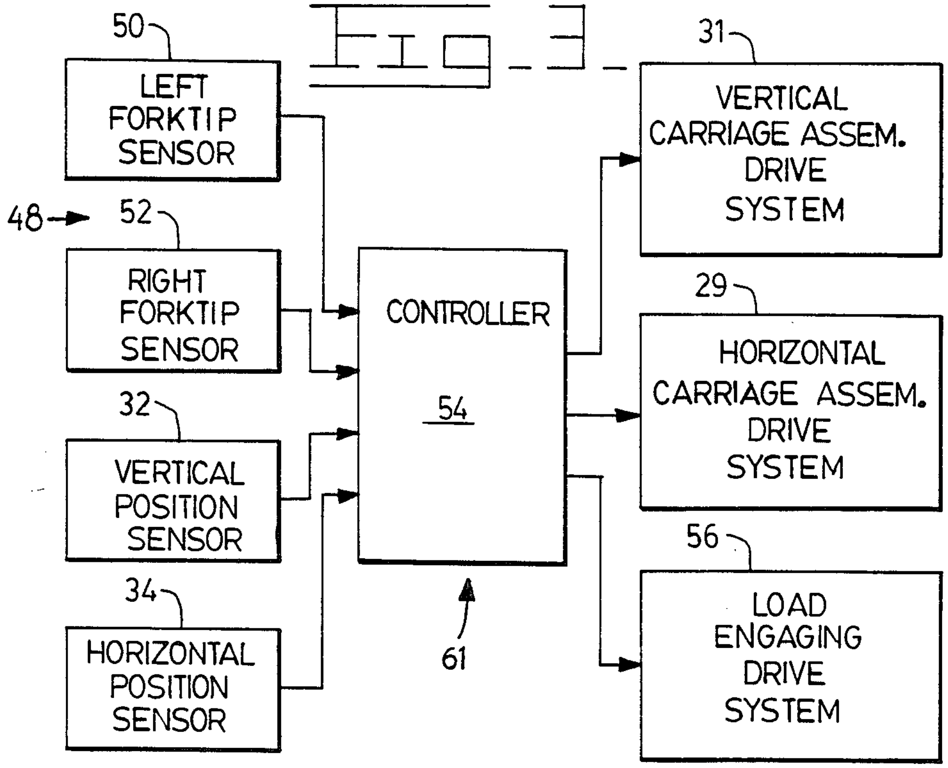

APPARATUS FOR CONTROLLABLY POSITIONING A LIFT MAST ASSEMBLY OF A WORK VEHICLE

TECHNICAL FIELD

This invention relates generally to apparatus and method for controlling the lift mast of a work vehicle and more particularly to apparatus for automatically positioning the carriage assembly of the mast at the horizontal and vertical center of a load opening.

BACKGROUND ART

In the field of automated load handling vehicles, the degree of flexibility is often the key factor in determining the usefulness of the system. Automated load handling vehicles receive, carry, and place loads in a variety of applications. However, oftentimes an automatic load handling vehicle which operates effectively in one application cannot adjust to a different application. Of course numerous factors determine the overall flexibility of an automated load handling system, including: the organization of the operating environment, the programmability of the load handling system, and the physical architecture of both the operating environment and the load handling vehicle. For example, if the programmability of a load handling vehicle is relatively low, then the organization of its operating environment should be relatively high to produce efficient results. Since attempting to organize every operating environment is difficult and expensive, the programmability of automated load handling systems is increasing in order to adapt to changing operating environments.

One important attribute for flexible load handling systems is the ability to automatically recognize, receive, and carry a load. Automated load handling systems employ markedly different loading systems. Many of these loading systems are directed towards a specific application, while others are adaptable to various applications. Automated forklift vehicles, for instance, find usefulness in a diversity of applications. Some prior loading systems for automated vehicles, such as forklifts, rely on an organized operating environment in order to receive a load. For instance, a warehouse having all loads positioned at a given height allows a vehicle to position its load carrying portion at the given height when loading. Other loading systems, such as that disclosed in U.S. Pat. No. 4,520,443 issued May 28, 1985 to Yuki et al., offer greater flexibility. The loading and unloading system includes a lift height sensor, a tilt sensor, and a load sensor. As a result of the outputs of these sensors, the fork height and the tilt angle of the lifting mast are controlled to facilitate the loading and unloading operations performed by the vehicle. U.S. Pat. No. 4,331,417 issued May 25, 1982 to Shearer, Jr. further senses the location of the load. This system controls the horizontal and vertical alignment of a load handling vehicle for loading and unloading. A triangular target, which is recognizable by a similarly designed sensor unit on the vehicle, is placed on each load. The horizontal position of the vehicle and the height of the forks are adjusted until alignment of the sensor with a given target is achieved.

Yet greater flexibility is needed. A truly autonomous vehicle should be able to recognize a load without relying on a target mechanism. Targets may deteriorate thus becoming ineffective, while adding cost to the overall load handling system. Furthermore, accurate positioning of the load carrying implement depends on the positioning of the target. Damage to the vehicle or the load is a possible result of inaccurate target location. In fact if the target is misaligned, the load recognition system cannot align with the target, and therefore cannot receive the load.

The present invention is directed to overcoming one or more of the problems as set forth above.

DISCLOSURE OF THE INVENTION

In one aspect of the present invention, a method for controllably moving a lift mast assembly of a work vehicle to a preselected position relative to a opening in a load is disclosed. The lift mast assembly has a lift mast and a side shiftable carriage assembly mounted on and elevationally moveable along the lift mast. The method includes sensing the position of the bottom edge of the load opening, sensing the position of the top edge of the load opening, and calculating a vertical target position as a function of the top and bottom edge positions. The method further includes sensing the position of the left edge of the load opening, sensing the position of the right edge of the load opening, and calculating a horizontal target position as a function of the left and right edge positions. The final steps of the method include moving the carriage assembly to the vertical and horizontal target positions and moving the carriage assembly into the load opening.

In another aspect of the present invention, an apparatus for controllably moving a lift mast assembly of a work vehicle to a preselected position relative to a opening in a load is disclosed. The lift mast assembly has a lift mast and a side shiftable carriage assembly mounted on and elevationally moveable along the lift mast, and a load engaging work implement having first and second end portions. The work implement first end portion is connected to the carriage assembly. A sensor means delivers electromagnetic radiation in a direction generally away from the work implement toward the load, detects reflected electromagnetic radiation, and delivers a first signal in response to detecting the reflected electromagnetic radiation. The sensor means is connected to the load engaging implement second end portion. The apparatus further includes a means for sensing the vertical height of the carriage assembly and means for controllably moving the carriage assembly in a first vertical direction, and storing the vertical height of the carriage assembly as a first vertical variable in response to a first vertical signal. A means controllably moves the carriage assembly in a second vertical direction, and stores the vertical height of the carriage assembly as a second vertical variable in response to a second vertical signal. A means calculates a vertical target position as a function of the first and second vertical variables. The apparatus further includes a means for sensing the horizontal position of the carriage assembly. A means controllably moves the carriage assembly in a first horizontal direction, and stores the horizontal position of the carriage assembly as a first horizontal variable in response to a first horizontal signal. A means controllably moves the carriage assembly in a second horizontal direction, and stores the horizontal position of the carriage assembly as a second horizontal variable in response to a second horizontal signal. A means calculates a horizontal target position as a function of the first and second horizontal variables. A means moves the carriage assembly to the vertical and horizontal target positions and a means moves the work implement into the load opening.

The briefly disclosed system above offers flexibility for an automated load handling system. Many automated load handling systems do not actually detect a load. Instead they are merely positioned in a location where a load should be. The disadvantages of systems of this nature are obvious. Many other load handling systems employ load detection systems having various degrees of complexity. Generally these load detection systems use targets for alignment of the load carrying implement with the load. The disadvantages of target recognition systems are apparent, as discussed previously.

To overcome these disadvantages, the present system offers an actual load detecting apparatus, which detects the load itself instead of a target. The present system adapts to a variety of load carrying structures and operating environments.

BRIEF DESCRIPTION OF THE DRAWINGS

For a better understanding of the present invention, reference may be made to the accompanying drawings, in which:

FIG. 1 illustrates a side view of a work vehicle with a mast and carriage assembly engaging a load;

FIG. 3 is a block diagram of an embodiment of an electronic control system;

BEST MODE FOR CARRYING OUT THE INVENTION

Figure 2:
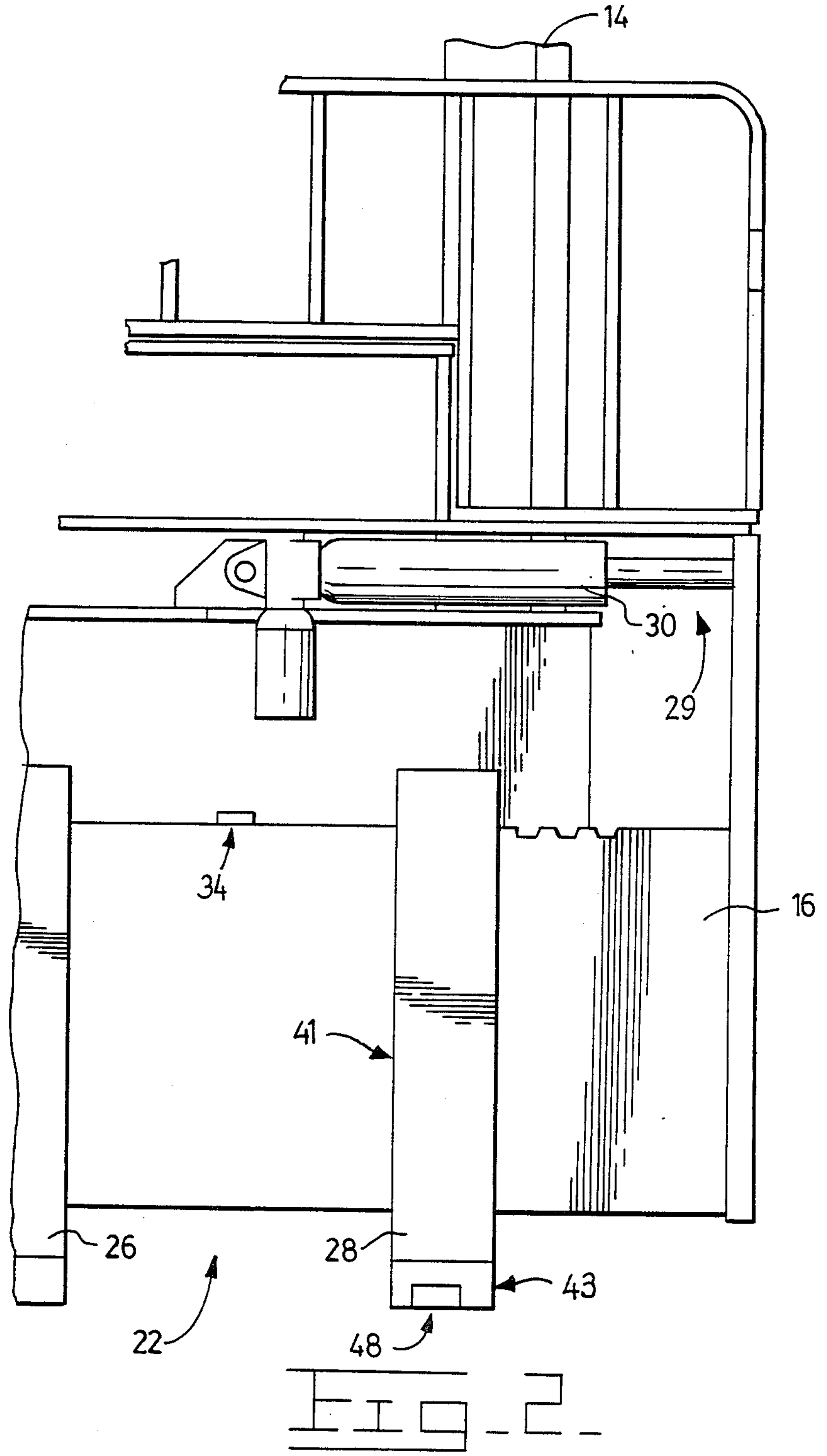
FIG. 2 illustrates a partial front view of the lift mast and carriage assembly.

Referring now to the drawings, wherein a preferred embodiment of the present apparatus 10 is shown. FIG. 1 illustrates a side view of an automated work vehicle 12, preferably shown as a forklift with a lift mast assembly 14 and carriage assembly 16 engaging a load 18. Typically the load 18 will have at least one opening 20 to accommodate a load engaging implement 22, preferably shown as a right and a left fork 28,26, each having a first and second end portions 41,43. After engaging the load 18, the carriage assembly 16 raises the load 18 for transport. In actual operation of the illustrated forklift vehicle 12, the mast assembly moves rearwardly, placing the load 18 on a deck 24 for transport.

FIG. 2 illustrates a partial front view of the lift mast 14 and the carriage assembly 16. The fork 22 has a first and second portion 26,28 mounted on the carriage assembly 16. A means 29 controllably moves the carriage assembly in the horizontal direction, preferably shown as a hydraulic cylinder 30 mounted between a stationary portion 15 and a movable portion 17 of the mast assembly 14 and the carriage assembly 16. The hydraulic cylinder 30 side shifts the carriage assembly 16 relative to the mast 14. A means 31 controllably moves the carriage assembly 16 in the vertical direction. Typically a chain drive as known in the art is used, accordingly no further description is provided herein. Therefore the load engaging implement 22, which includes the forks 28,26 of the carriage assembly 16 are capable of moving horizontally and vertically relative to the stationary work vehicle 12.

Figure 4:
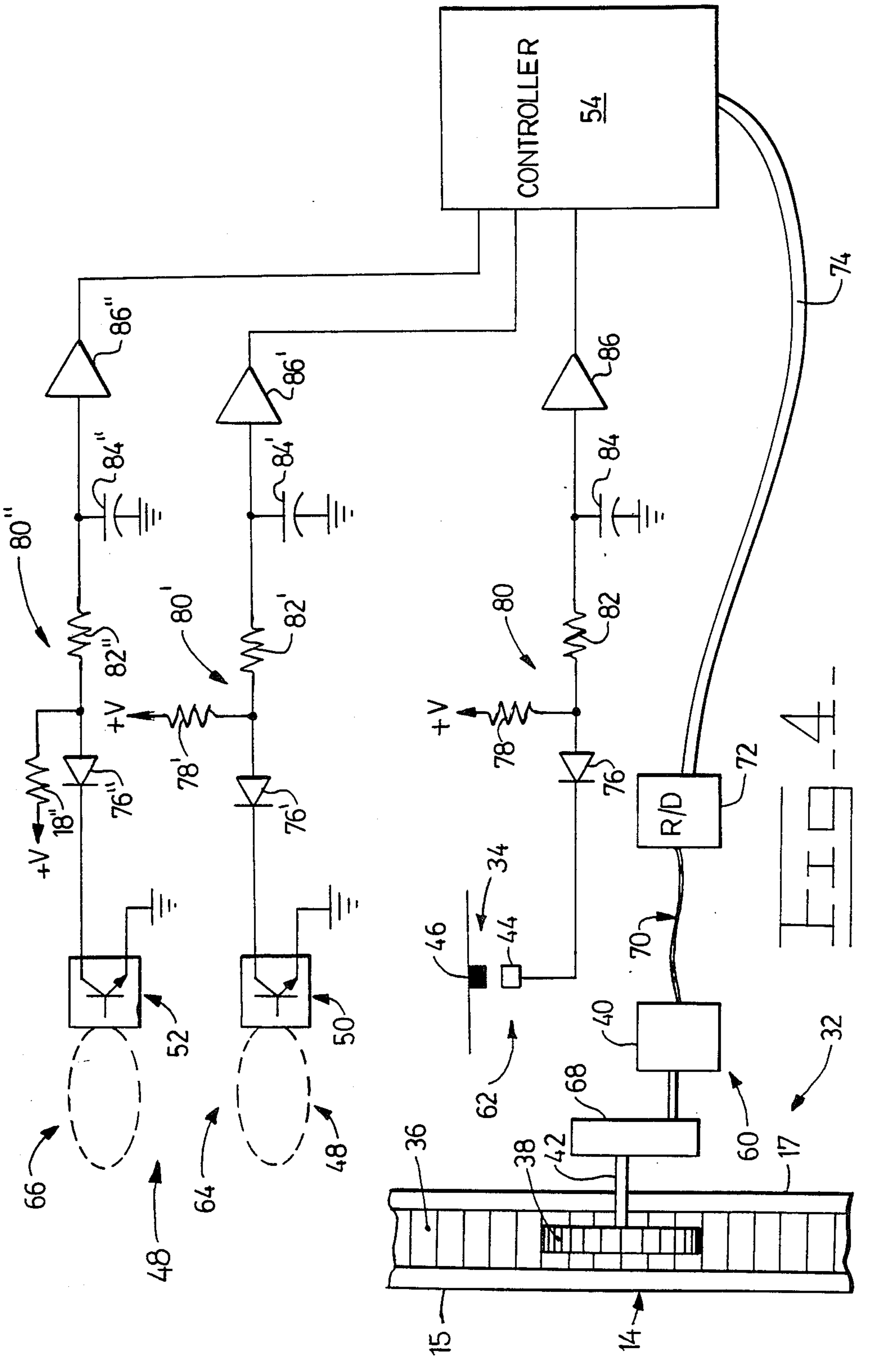
FIG. 4 is an electrical schematic of an embodiment of the control system.

Referring to FIG. 4, sensing means 32,34 provide an indication of the vertical and horizontal position of the carriage assembly 16 relative to the vehicle 12. Preferably the vertical sensing means 32 includes a "ladder"assembly 36 mounted on a vertically moveable portion 17 of the mast 14. Preferably the ladder assembly 36 is a plastic construction having "rungs" or "teeth"adapted to engage a gear. A gear 38, mounted on a stationary portion 15 of the mast 14, is rotatably engaged with the ladder assembly 36. As the mast 14 moves the carriage assembly 16 vertically, the gear 38 rotates. The rotational movement of the gear 38 is transferred to a resolver 40 for application to an electronic control system 61. Preferably the horizontal sensing means 34 includes a hall effect sensor 44 and a permanent magnet 46. The hall effect sensor 44 is mounted on a moveable portion 17 of the mast 14 and the permanent magnet 46 is mounted on the carriage assembly 16, therefore keeping the hall effect sensor 44 and the permanent magnet 46 in vertical relation to one another. As the side shift hydraulic cylinder 30 moves the carriage assembly 16 horizontally, the permanent magnet 46 moves relative to the hall effect sensor 44. The hall effect sensor 44 delivers a signal in response to the permanent magnet 46 moving past it. The hall effect sensor 44 and the permanent magnet 46 are preferably arranged to deliver a signal in response to the carriage assembly 16 being centered with respect to the vehicle 12.

A load detecting sensor means 48 delivers electromagnetic radiation in a direction generally away from the work implement 22 and towards the load 18. The sensor means 48 detects reflected electromagnetic radiation, and preferably delivers a signal in response to detecting the reflected electromagnetic radiation. For implementation on a forklift vehicle 12, a plurality of sensors 50,52 are used, one being connected to each tip of the second end portion 43 of each fork 28,26. The fork tip sensors 50,52 emit electromagnetic radiation towards the load 18, and deliver a signal indicative of the presence or absence of an object being in the path of the electromagnetic radiation.

FIG. 3 is a block diagram of an embodiment of the electronic control system 61 for the automated load handling vehicle 12. As shown the control system 61 utilizes outputs from the sensor means 48, the vertical sensing means 32, and the horizontal sensing means 34, but it is understood that this is a preferred embodiment and that other types of sensing means fall within the scope of this invention. The following discussion will be directed towards the control system 61 used on a forklift vehicle 12, thus the fork tip sensors 50,52 are specifically set forth. A controller 54 under software control receives signals from the various sensors 32,34,50,52. Moreover, the controller 54 may receive signals from a remote controller, not shown. The controller 54 is capable of controlling vertical and horizontal movement of the carriage assembly 16, via respective drive systems 31,29, and a load engaging drive system 56 which may include a vehicle drive system. The controller 54 typically includes a microprocessor, static and dynamic memory, and controlling software. Since these are well known in the art of vehicle control, a detailed description is not provided herein. Moreover, a detailed description of the vertical, horizontal, and load engaging drive systems are not presented here, since many designs are known in the art.

The controller 54 receives signals indicative of the vertical and horizontal height of the carriage assembly 16, and signals indicative of the presence or absence of the load 18. Using these signals, the controller 54 searches for the opening 20 in the load 18, calculates a target position for the carriage assembly 16, and controllably positions the carriage assembly 16 at the target position. Once positioned, the controller 54 moves the load engaging implement 22 on the carriage assembly 16 into the opening 20 of the load 18. The controller 54 may control different portions of a vehicle 12 to engage the load 18. For instance, the vehicle of FIG. 1 can remain stationary while the mast 14 and carriage assembly 16 moves relative to the vehicle 12 via a separate drive mechanism to insert the forks 28,26 into the opening 20 or engages the vehicle drive system to move the vehicle and thus the forks 28,26 into the load opening 20 via a separate drive mechanism. However, less complex vehicles engage the vehicle drive system to move into the FIG. 4 is an electrical schematic of an embodiment of the control system 61 detailing the input channels 60,62,64,66 for each of the respective sensors 32,34,50,52. The first input channel 60 connects the vertical sensing means 32 to the controller 54. The vertical sensing means 32 preferably includes a ladder assembly 36, as described previously, mounted on a vertically moveable portion of the mast 14. A gear 38, mounted on the stationary portion 15 of the mast 14, rotatably engages the ladder assembly 36. The rotary motion of the gear 38 transfers via a shaft 42 to a resolver 40. The resolver 40 is known in the art in that it is excited by a constant frequency signal and delivers a pair of constant frequency signals which have a magnitude and phase relationship proportional to the angular position of the resolver. A gear box 68 may be connected intermediate the shaft 42 and the resolver 40 should a gearing change be desirable. The resolver 40 is connected via analog lines 70 to a resolver-to-digital (R/D) converter 72. The R/D converter 72 is of a conventional design, for example Model No. 1S4510 produced by Analog Devices, Inc. of Norwood, Mass. U.S.A. The R/D converter 72 accepts analog signals produced by the resolver 40 in response to the rotation of the shaft 42, and produces a multi-bit digital signal correlative to the amount of shaft rotation. The multi-bit signal indicative of the vertical height of the carriage assembly 16 is supplied to the controller 54 via a bus 74.

The second input channel 62 connects the horizontal sensing means 34 to the controller 54. The placement and general operation of the preferable implementation of the horizontal sensing means 34, which includes a permanent magnet 46 and a hall effect sensor 44, were discussed previously. The output of the hall effect sensor is connected to the cathode of a diode 76. The anode of the diode 76 is connected to a pull-up resistor 78 and a lowpass filter 80. The lowpass filter 80 includes a series resistor 82 connected on a first end to the anode of the diode 76 and connected on a second end to a capacitor 84. The capacitor 84 is also connected to circuit ground. The lowpass filter 80 is connected to the controller 54 via an amplifier 86. When the permanent magnet 46 passes the hall effect sensor 44 a pulse appears on the second input channel 62. The lowpass filter 80 filters high frequency noise from the pulse, and the amplifier 86 delivers an amplified pulse to the controller 54. An algorithm in the controller 54 detects the pulse. Horizontal position is determined as a function of the pulse and the velocity of the horizontal movement.

The third and fourth input channels 64,66 connect the fork tip sensors 50,52 to the controller 54. As can be seen from the drawing, the third and fourth input channels 64,66 are identical to the second input channel 62, thus reference may be made to the above description for detailed operation. Accordingly, like elements are numbered similar to those of the second input channel 62. The fork tip sensors 50,52 illustrated have open collector outputs and can be purchased commercially.

Figures 5A, 5B:
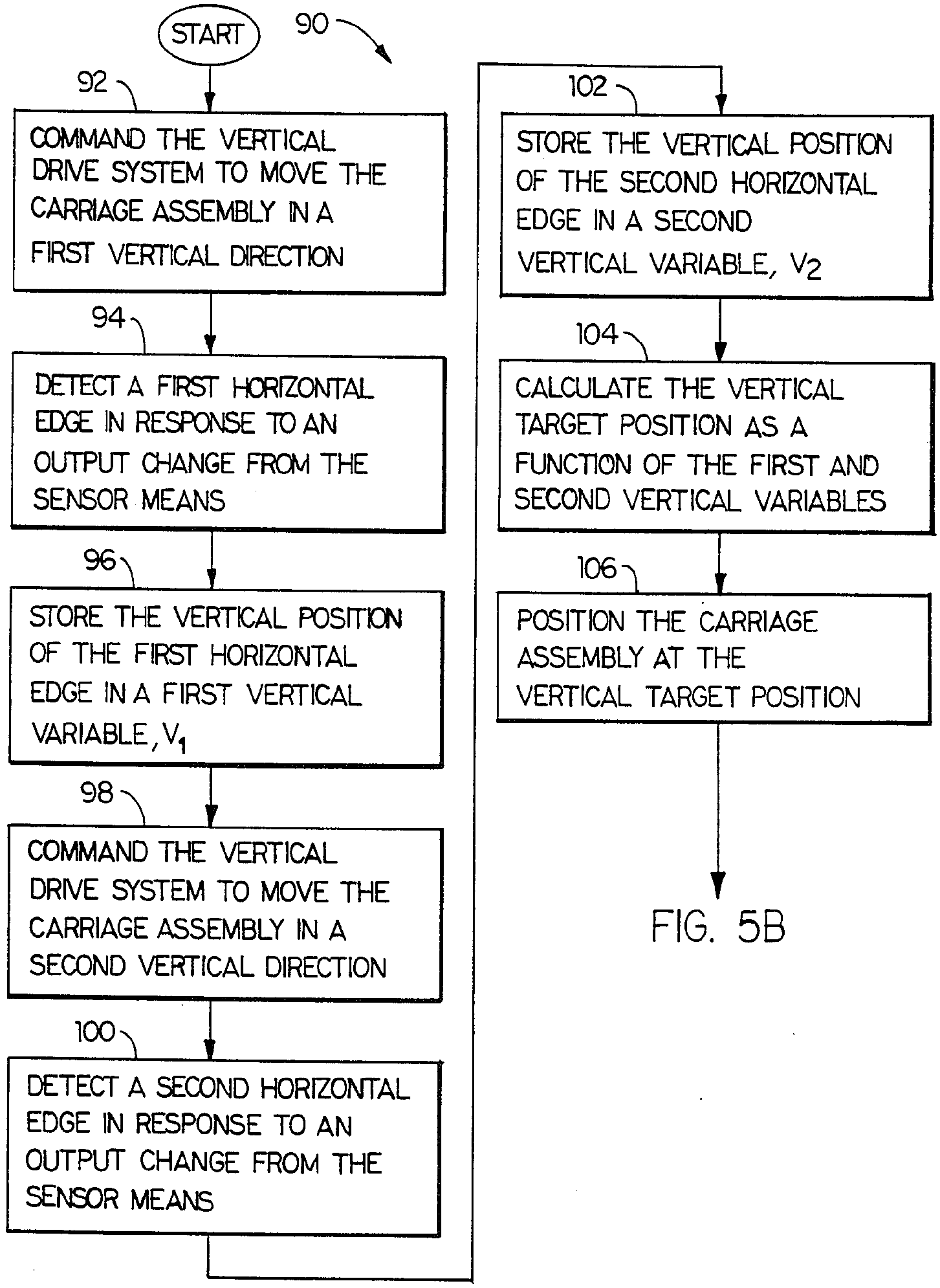
FIG. 5A is a flow chart representation of a portion of an embodiment of the software control routine.
FIG. 5B is a flow chart representation of the remaining portion of the embodiment of the software control routine shown in FIG. 5A.
Figures 5A, 5B:
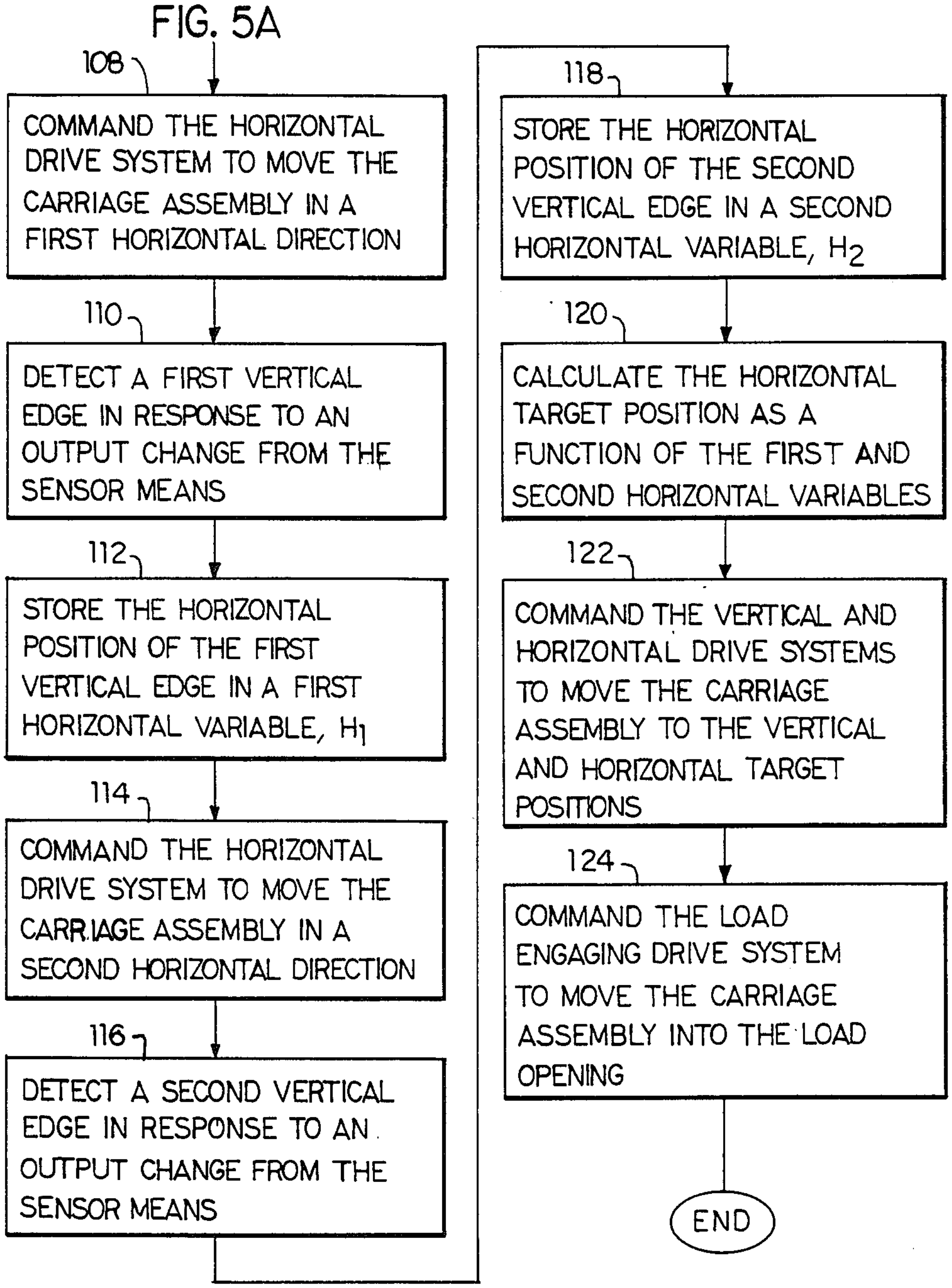

FIG. 5A and FIG. 5B combine to form a flow chart representation of a preferred embodiment of the software control routine. As stated previously, the controller 54 monitors the sensors 32,34,48 and performs a search for the load opening 20. After the automated load handling vehicle 12 is positioned adjacent the load 18, the software routine depicted in the flowchart 90 is activated. The carriage assembly 16 is initially at a preferably predetermined height, which may be anywhere in the range of vertical travel. First a vertical search for the load opening 20 is performed, as illustrated by the control blocks 92–106. The vertical carriage drive system 31 controllably moves the carriage assembly 16 in a first vertical direction to detect the top or bottom edge of the load opening 20. An edge is detected and a signal is generated when the output of the sensor means 48 changes state (i.e., when the output changes from a logical "1" to a logical "0" or vice versa). The preferable electromagnetic sensor means 48 delivers a logical "1" as a first signal in response to detecting reflected electromagnetic radiation, and a logical "0"otherwise. For example, assuming an upwardly moving carriage assembly 16, the output transition from a logical "1" to a logical "0" indicates the bottom edge of an opening 20, and the output transition from a logical "0" to a logical "1" indicates the top edge of an opening 20. When an edge is detected, the controller 54 stores the vertical height from the vertical sensing means 32 as a first vertical variable V. Once the first edge is detected the carriage assembly 16 controllably moves in a second vertical direction to find the other edge of the opening 20. The controller 54 stores the second edge as a second vertical variable $V_2$. Note that the second vertical direction may be the same as the first vertical direction depending on (1) the initial direction and (2) which edge is detected first. The controller 54, upon finding and storing the positions of both the bottom edge and the top edge of the opening 20, calculates a vertical target position as a function of the top and bottom edge positions.

Next a horizontal search for the load opening 20 is performed, as illustrated by the control blocks 108–122. The horizontal carriage drive system 29 controllably moves the carriage assembly 16 in a first horizontal direction to find the left or the right edge of the opening 20. An edge is detected when the output of the sensor means 48 changes state, as described above. When an edge is detected, the controller 54 stores the horizontal position from the horizontal sensing means 34 as a first horizontal variable $H_1$. Once the first edge is detected the carriage assembly 16 controllably moves in a second horizontal direction to find the other edge of the opening 20. The controller 54 stores the second edge as a second horizontal variable $H_2$. As noted above the second horizontal direction may be the same as the first horizontal direction in some instances. The controller 54, upon finding and storing the positions of both the left edge and the right edge of the opening 20, calculates a horizontal target position as a function of the left and right edge positions.

Next the controller 54 commands the vertical and horizontal carriage drive systems 31,29 to move the carriage assembly 16 to the vertical and horizontal target positions. Preferably the controller 54 averages the top and bottom edge positions to calculate the vertical center of the opening 20 to use as the vertical target position. Likewise the controller 54 averages the left and right edge positions to calculate the horizontal center of the opening 20 to use as the horizontal target position. Once in the vertical and horizontal target positions, the controller 54 commands the load engaging drive system 56 to move the carriage assembly 16 into the load opening 20.

The controller 54 preferably carries out additional calculations based on the first and second vertical variables and the first and second horizontal variables. A means 59 calculates the vertical dimension of the load opening 20 as a function of the first and second vertical variables. The calculated vertical dimension is compared to a preselected vertical dimension. If the preselected vertical dimension is greater than the calculated vertical dimension, the controller 54 delivers a terminating signal in response thereto. The controller 54 prevents movement of the load engaging implement 22 into the load opening 20 in response to the terminating signal. The preselected vertical dimension represents a lower limit. If the calculated vertical dimension is not greater than the preselected vertical dimension, then the vertical dimension of the opening may be too small to facilitate easy automatic handling of the load 18 by the vehicle 12, thus the controller 54 does not allow the work implement 22 to engage the load 18. Likewise, a means 59 calculates the horizontal dimension of the load opening 20 as a function of the first and second horizontal variables. The calculated horizontal dimension is compared to a preselected horizontal dimension. If the preselected horizontal dimension is greater than the calculated horizontal dimension, the controller 54 delivers a terminating signal in response thereto. The controller 54 prevents movement of the work implement 22 into the load opening in response to the terminating signal. The preselected horizontal dimension represents a lower limit. If the calculated horizontal dimension is not greater than the preselected horizontal dimension, then the horizontal dimension of the opening may be too small to facilitate easy automatic handling of the load 18 by the vehicle 12, thus the controller 54 does not allow the work implement 22 to engage the load 18.

Figure 6A:
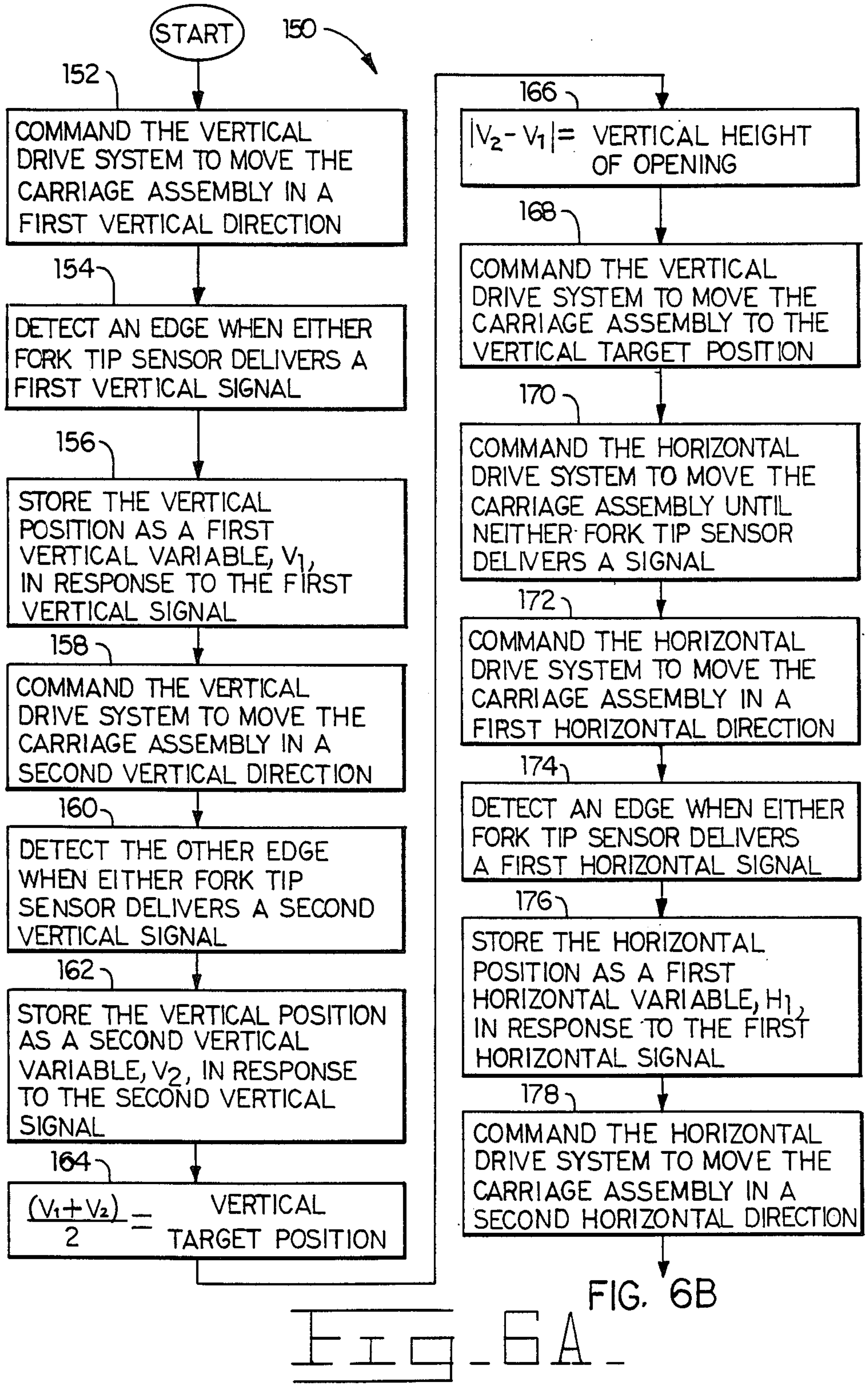
FIG. 6A is a flow chart representation of a portion of another embodiment of the software control routine.
Figures 6A, 6B:
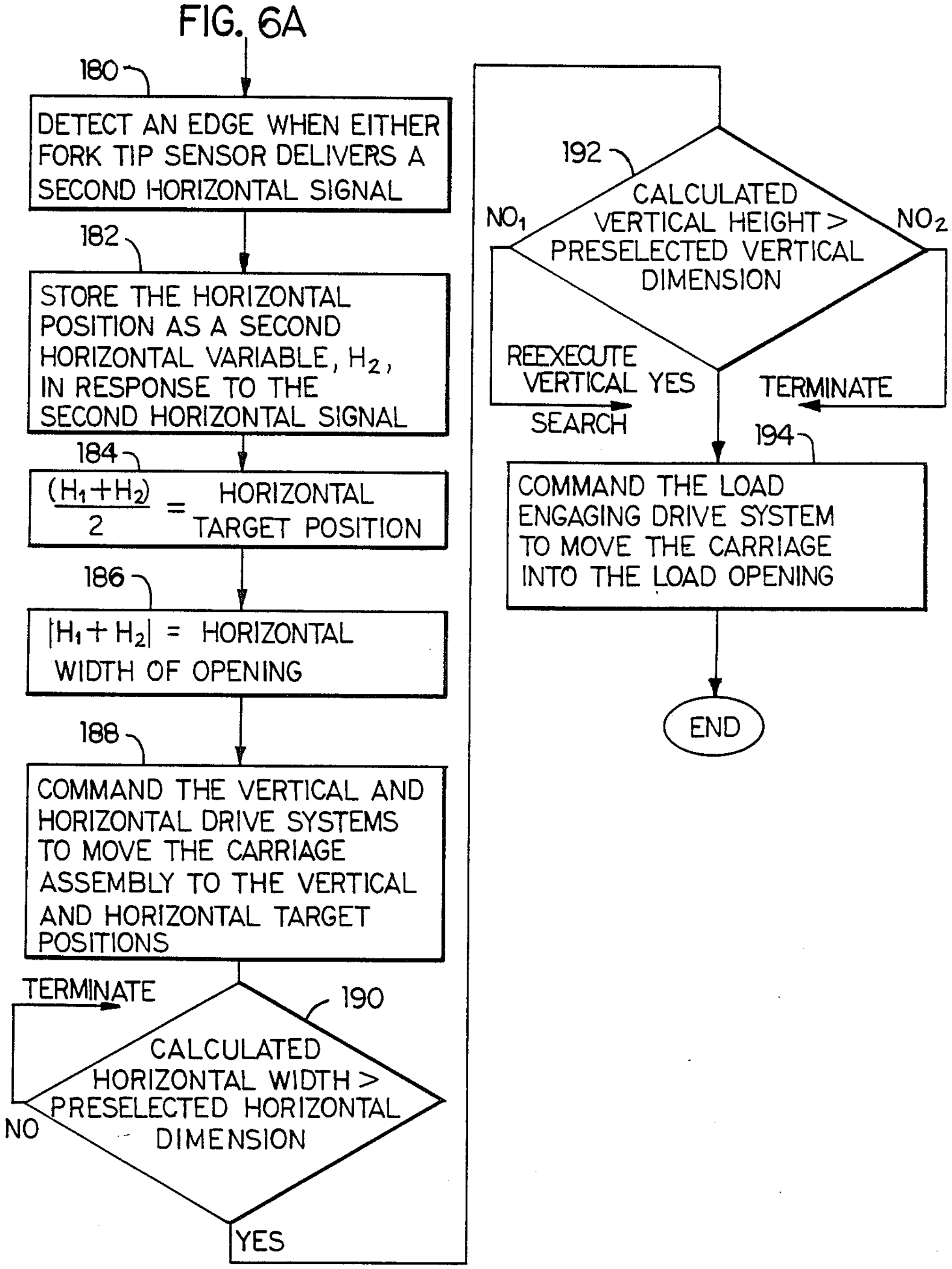
FIG. 6B is a flow chart representation of the remaining portion of the embodiment of the software control routine shown in FIG. 6A.

FIG. 6A and FIG. 6B combine to form a flow chart representation of another embodiment of the software control routine. This embodiment of the software control routine controls a forklift vehicle having a plurality of load detecting fork tip sensors 50,52. The controller 54 monitors the sensors 32,34,50,52 and performs a search for the load opening 20. Forklifts typically handle bins or pallets. Bins have a continuous opening as illustrated in FIG. 1, while pallets typically have a separate opening for each second end portion 43 of each fork 22. Accordingly, this embodiment allows a forklift to detect either type of opening. After the automated load handling forklift vehicle 12 is positioned adjacent the load 18, the software routine depicted in the flowchart 150 is activated. The carriage assembly 16 is initially at a predetermined height, preferably in front of the load opening 20. First a vertical search for the load opening 20 is performed, as illustrated by the control blocks 152–166. The vertical carriage drive system 31 controllably moves the carriage assembly 16 in a first vertical direction to detect the top or bottom edge of the load opening 20. A first horizontal edge is detected when either of the fork tip sensors 50,52 delivers a first vertical signal. The controller 54 stores the vertical height as a first second vertical variable in $V_1$ response to the first signal. Next the vertical carriage drive system 31 controllably moves the carriage assembly 16 in a second vertical direction to detect the other edge of the opening 20. When either of the fork tip sensors 50,52 delivers a second vertical signal, the controller 54 stores the vertical height as a second vertical variable $V_2$ in response receiving to the second vertical signal. The controller 54 averages the first and second vertical variables to obtain a vertical target position. The controller 54 also calculates the vertical height of the opening 20 by subtracting the first vertical variable from the second vertical variable and taking the absolute value of the difference.

To begin the horizontal search, depicted by the control blocks 168–186, the controller 54 commands the vertical carriage assembly drive system 31 to position the carriage assembly !6 at the vertical target position. The controller 54 horizontally shifts the carriage assembly, via the horizontal carriage assembly drive system 29, until both fork tip sensors 50,52 are in front of the opening (i.e., neither fork tip sensor is delivering a signal). The horizontal carriage drive system 29 controllably moves the carriage assembly 16 in a first horizontal direction to detect the left or right edge of the load opening 20. A first vertical edge is detected when either of the fork tip sensors 50,52 delivers a first horizontal signal. The controller 54 stores the horizontal position as a first horizontal variable $H_1$ in response to the first horizontal signal. Next the horizontal carriage drive system 31 controllably moves the carriage assembly 16 in a second horizontal direction to detect the other edge of the opening 20. When either of the fork tip sensors 50,52 delivers a second horizontal signal, the controller 54 stores the horizontal position as a second horizontal variable $H_2$ in response receiving the second horizontal signal. The controller 54 averages the first and second horizontal variables to obtain a horizontal target position. The controller 54 also calculates the horizontal width of the opening 20 by subtracting the first horizontal variable from the second horizontal variable and taking the absolute value of the difference.

Next, as illustrated in the control blocks 188-194, the controller 54 commands the vertical and horizontal carriage drive systems 31,29 to move the carriage assembly 16 to the vertical and horizontal target positions. The controller 54 compares the calculated horizontal width to a preselected horizontal dimension. If the calculated horizontal width is less than the preselected horizontal dimension, the search failed and a terminating signal is delivered which prevents the load engaging drive system 56 from moving the carriage assembly into the opening 20. If the calculated horizontal width is greater than the preselected horizontal dimension, the search was successful and the calculated vertical height is compared to a preselected vertical dimension. If the calculated vertical height is less than the preselected vertical height, the vertical search is reexecuted afterwhich control returns to the decision block 192 where the vertical height calculated in the second vertical search is compared to the preselected vertical dimension. If the second search fails, a terminating signal is delivered which prevents the load engaging drive system 56 from moving the carriage assembly into the opening 20. However, if the calculated vertical height is greater than the preselected vertical height, the controller 54 commands the load engaging drive system 56 to move the carriage assembly 16 into the load opening 20.

Industrial Applicability

In the overall operation of the automated load handling vehicle !2, the apparatus 10 performs an automated search for an opening 20 in a load 18. The apparatus 10 controls a forklift vehicle 12, for instance, having a plurality of load detecting fork tip sensors 50,52. The controller 54 monitors the sensors 32,34,50,52 and performs a search for the load opening 20. After the automated load handling forklift vehicle 12 is positioned adjacent the load 18, the software routine depicted in the flowchart 150, for instance, is activated. The carriage assembly 16 is initially at a predetermined height, preferably in front of the load opening 20. First a vertical search for the load opening 20 is performed. The vertical carriage drive system 31 controllably lowers the carriage assembly 16 to detect the bottom edge of the load opening 20. The bottom edge is detected when either of the fork tip sensors 50,52 delivers a first vertical signal in response to receiving electromagnetic radiation reflected from the load to the sensor. The controller 54 stores the vertical height of the bottom edge as a first vertical variable in response to the first vertical signal. Next the vertical carriage drive system 31 controllably raises the carriage assembly 16 to detect the upper edge of the opening 20. When either of the fork tip sensors 50,52 delivers a second vertical signal, the controller 54 stores the vertical height of the upper edge as a second vertical variable in response to the second vertical signal. The controller 54 averages the first and second vertical variables to obtain a vertical target position. The controller 54 also calculates the vertical height of the opening 20 by subtracting the first vertical variable from the second vertical variable and taking the absolute value of the difference.

To begin the horizontal search, the controller 54 commands the vertical carriage assembly 16 drive system 31 to position the carriage assembly 16 at the vertical target position. The controller 54 horizontally shifts the carriage assembly, via the horizontal carriage assembly drive system 29, until both fork tip sensors 50,52 are in front of the opening (i.e., neither fork tip sensor is delivering a signal). The horizontal carriage drive system 29 controllably moves the carriage assembly 16 to the left to detect the left edge of the load opening 20. The left edge is detected when either of the fork tip sensors 50,52 delivers a first horizontal signal. The controller 54 stores the horizontal position of the left edge as a first horizontal variable in response to the first horizontal signal. Next the horizontal carriage drive system 31 controllably moves the carriage assembly 16 to the right to detect the right edge of the opening 20. When either of the fork tip sensors 50,52 delivers a second horizontal signal, the controller 54 stores the horizontal position as a second horizontal variable in response to the second horizontal signal. The controller 54 averages the first and second horizontal variables to obtain a horizontal target position. The controller 54 also calculates the horizontal width of the opening 20 by subtracting the first horizontal variable from the second horizontal variable and taking the absolute value of the difference.

Next the controller 54 commands the vertical and horizontal carriage drive systems 31,29 to move the carriage assembly 16 to the vertical and horizontal target positions. The controller 54 compares the calculated horizontal width to a preselected horizontal dimension, and the calculated vertical height to a preselected vertical dimension. If the calculated dimensions are greater than the preselected dimensions, the controller 54 commands the load engaging drive system 56 to move the carriage assembly 16 into the load opening 20.

Other aspects, objects, and advantages of this invention can be obtained from a study of the drawings, the disclosure, and the appended claims.

I claim:

1. An apparatus for controllably moving a lift mast assembly of a work vehicle to a preselected position relative to an opening in a load, the lift mast assembly having a lift mast and a carriage assembly having a side shiftable load engaging implement, said carriage assembly being mounted on and elevationally moveable along the lift mast, said load engaging implement having first and second end portions, said second end portion extending from the carriage assembly, the apparatus comprising:

sensor means for delivering electromagnetic radiation in a direction generally away from the work implement toward the load, detecting reflected electromagnetic radiation, and delivering a signal in response to detecting the reflected electromagnetic radiation, said sensor means being connected to the second end portion of said work implement;

means for sensing the vertical height of the carriage assembly;

means for controllably moving the carriage assembly in first and second vertical directions;

means for storing the vertical height of the carriage assembly as a first vertical variable in response to receiving a first vertical signal from the sensor means and storing the vertical height of the carriage assembly as a second vertical variable in response to receiving a second vertical signal;

means for sensing the horizontal position of the carriage assembly;

means for controllably moving the carriage assembly in first and second horizontal directions, said storing means storing a first horizontal position of the carriage assembly as a first horizontal variable in response to receiving a first horizontal signal and storing a second horizontal position of the carriage assembly as a second horizontal variable in response to receiving a second horizontal signal, said calculating means calculating a horizontal target position as a function of the first and second horizontal variables, and said horizontal and vertical carriage moving means moving the carriage assembly to the vertical and horizontal target positions;

means for calculating one of a vertical and horizontal dimension of the load opening as a function of the respective vertical and horizontal first and second variables, comparing said one calculated dimension to a respective one of preselected vertical and horizontal dimension, and delivering a terminating signal in response to the one preselected dimension being greater than the one calculated dimension; and means for moving the load engaging implement into the load opening; and means for preventing movement of the load engaging implement into the load opening in response to receiving the terminating signal.

2. The apparatus, as set forth in claim 1, including:

means for calculating the other of the horizontal and vertical dimension of the load opening as a function of the respective horizontal and vertical first and second variables, comparing the other calculated dimension to the other preselected horizontal and vertical dimension, and delivering a terminating signal in response to the other preselected dimension being greater than the other calculated dimension.

3. An automatic fork positioning apparatus for controllably moving a lift mast assembly of a forklift to a preselected position relative to an opening in a pallet, the lift mast assembly having a lift mast and a carriage assembly having a side shiftable load engaging implement, said carriage assembly being mounted on and elevationally moveable along the lift mast, said load engaging implement having a fork having first and second end portions, said second end portion extending from the carriage assembly, the apparatus comprising;

sensor means for delivering electromagnetic radiation in a direction generally away from the work implement toward the load, detecting reflected electromagnetic radiation, and delivering a signal in response to detecting the reflected electromagnetic radiation, said sensor means being connected to the second end portion of said fork;

means for sensing the vertical height of the carriage assembly;

means for controllably moving the carriage assembly in first and second vertical directions;

means for storing the vertical height of the carriage assembly as a first vertical variable in response to receiving a first vertical signal from the sensor means and storing the vertical height of the carriage assembly as a second vertical variable in response to receiving a second vertical signal from the sensor means;

means for sensing the horizontal position of the carriage assembly;

means for controllably moving the carriage assembly in first and second horizontal directions, said storing means storing a first horizontal position of the carriage assembly as a first horizontal variable in response to receiving a first horizontal signal and storing a second horizontal position of the carriage assembly as a second horizontal variable in response to receiving a second horizontal signal, said calculating means calculating a horizontal target position as a function of the first and second horizontal variables, and said horizontal and vertical carriage moving means moving the carriage assembly to the vertical and horizontal positions;

means for calculating one of a vertical and horizontal dimension of the load opening as a function of the respective vertical and horizontal first and second variables, comparing the one calculated dimension to a respective one of preselected vertical and horizontal dimension, and delivering a terminating signal in response to the one preselected dimension being greater than the one calculated dimension;

means for moving the fork into the load opening; and means for preventing movement of the fork into the load opening in response to receiving the terminating signal.

4. The apparatus, as set forth in claim 3, including:

means for calculating the other of the horizontal and vertical dimension of the load opening as a function of the respective horizontal and vertical first and second variables, comparing said other calculated dimension to a respective preselected horizontal and vertical dimension, and delivering a terminating signal in response to the other preselected dimension being greater than the other calculated dimension.

5. A method for controllably moving a lift mast assembly of a work vehicle to a preselected position relative to an opening in a load defined by top and bottom and right and left edges, said lift mast assembly having a lift mast and a side shiftable carriage assembly mounted on and elevationally moveable along the lift mast, the method comprising the steps of:

sensing the position of the bottom edge of the load opening;

sensing the position of a top edge of the load opening;

calculating a vertical target position as a function of the top and bottom edge positions;

sensing a position of the left edge of the load opening;

sensing the position of the right edge of the load opening;

calculating a horizontal target position as a function of the left and right edge positions;

moving the carriage assembly to the vertical and horizontal target positions;

calculating the vertical dimension of the load opening;

comparing the calculated vertical dimension to a preselected vertical dimension; and maintaining the carriage assembly from movement into the load opening in response to the calculated vertical dimension being less than the preselected vertical dimension.

6. The method, as set forth in claim 5 including the steps of:

calculating the horizontal dimension of the load opening;

comparing the calculated horizontal dimension to a preselected horizontal dimension; and maintaining the carriage assembly from movement into the load opening in response to the calculated horizontal dimension being less than the preselected horizontal dimension.

7. A method for controllably moving a lift mast assembly of a work vehicle to a preselected position relative to an opening in a load defined by top and bottom and right and left edges, said lift mast assembly having a lift mast and a side shiftable carriage assembly mounted on and elevationally moveable along the lift mast, the method comprising the steps of:

sensing the position of the bottom edge of the load opening;

sensing the position of a top edge of the load opening;

calculating a vertical target position as a function of the top and bottom edge positions;

sensing a position of the left edge of the load opening;

sensing the position of the right edge of the load opening;

calculating a horizontal target position as a function of the left and right edge positions;

moving the carriage assembly to the vertical and horizontal target positions;

sensing the position of the top edge;

sensing the position of the bottom edge;

calculating a vertical target position; and moving the carriage assembly into the load opening.

8. A method for controllably moving a lift mast assembly of a work vehicle to a preselected position relative to an opening in a load defined by top and bottom and right and left edges, said lift mast assembly having a lift mast and a side shiftable carriage assembly mounted on and elevationally moveable along the lift mast, the method comprising the steps of:

sensing the position of the bottom edge of the load opening;

sensing the position of a top edge of the load opening;

calculating a vertical target position as a function of the top and bottom edge positions;

sensing a position of the left edge of the load opening;

sensing the position of the right edge of the load opening;

calculating a horizontal target position as a function of the left and right edge positions;

moving the carriage assembly to the vertical and horizontal target positions;

moving the carriage assembly into the load opening; and repeating the steps of:

sensing the position of the bottom edge of the load opening;

sensing the position of the top edge of the load opening; and calculating a vertical target position as a function of the top and bottom edge positions in response to failure to sense one of the top and bottom edges.

* * * * *

UNITED STATES PATENT AND TRADEMARK OFFICE
CERTIFICATE OF CORRECTION

PATENT NO. : 4,869,635

DATED : September 26, 1989

INVENTOR(S) : Darren L. Krahn

It is certified that error appears in the above-identified patent and that said Letters Patent is hereby corrected as shown below:

On the title page, item [54] and in column 1, lines 2-4:
Title of Invention, insert --And Method-- after "Apparatus".

Signed and Sealed this

Twenty-second Day of January, 1991

*Attest:*

HARRY F. MANBECK, JR.

*Attesting Officer* *Commissioner of Patents and Trademarks*